(12) United States Patent
Wiebe et al.

(10) Patent No.: US 11,295,207 B2
(45) Date of Patent: Apr. 5, 2022

(54) QUANTUM DEEP LEARNING

(71) Applicant: Microsoft Technology Licensing, LLC, Redmond, WA (US)

(72) Inventors: Nathan Wiebe, Redmond, WA (US); Krysta Svore, Seattle, WA (US); Ashish Kapoor, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 849 days.

(21) Appl. No.: 15/532,996

(22) PCT Filed: Nov. 28, 2015

(86) PCT No.: PCT/US2015/062848
§ 371 (c)(1),
(2) Date: Jun. 2, 2017

(87) PCT Pub. No.: WO2016/089711
PCT Pub. Date: Jun. 9, 2016

(65) Prior Publication Data
US 2017/0364796 A1    Dec. 21, 2017

Related U.S. Application Data

(60) Provisional application No. 62/088,409, filed on Dec. 5, 2014.

(51) Int. Cl.
*G06N 3/04* (2006.01)
*G06N 3/08* (2006.01)
(Continued)

(52) U.S. Cl.
CPC .................. *G06N 3/08* (2013.01); *A01D 5/00* (2013.01); *D02G 1/008* (2013.01); *D02G 1/10* (2013.01); *G06N 3/0445* (2013.01); *G06N 10/00* (2019.01)

(58) Field of Classification Search
CPC ......... G06N 3/08; G06N 10/00; G06N 3/0445
See application file for complete search history.

(56) References Cited

U.S. PATENT DOCUMENTS 7,860,596 B2 *  12/2010  Guez ................... G05B 13/042
                                                        257/184
8,892,857 B2 *  11/2014  Ozols ..................... G06N 10/00
                                                        713/1

(Continued)

FOREIGN PATENT DOCUMENTS

| CN | 102034133 | 4/2011 |
|---|---|---|
| WO | WO 2014/055293 | 4/2014 |
| WO | WO 2015/085190 | 6/2015 |

OTHER PUBLICATIONS

Dumoulin, Vincent, Ian J. Goodfellow, Aaron Courville, and Yoshua Bengio. "On the Challenges of Physical Implementations of RBMs." arXiv preprint arXiv:1312.5258 (2013). (Year: 2013).*

(Continued)

*Primary Examiner* — Alexey Shmatov
*Assistant Examiner* — Casey R. Garner
(74) *Attorney, Agent, or Firm* — Klarquist Sparkman, LLP

(57) ABSTRACT

Boltzmann machines are trained using an objective function that is evaluated by sampling quantum states that approximate a Gibbs state. Classical processing is used to produce the objective function, and the approximate Gibbs state is based on weights and biases that are refined using the sample results. In some examples, amplitude estimation is used. A combined classical/quantum computer produces suitable weights and biases for classification of shapes and other applications.

18 Claims, 14 Drawing Sheets

(51) Int. Cl.
*G06N 10/00* (2019.01)
*D02G 1/10* (2006.01)
*D02G 1/00* (2006.01)
*A01D 5/00* (2006.01)

(56) References Cited

U.S. PATENT DOCUMENTS

| | | | | |
|---|---|---|---|---|
| 2008/0301077 | A1* | 12/2008 | Fung | G16H 50/20 706/46 |
| 2014/0187427 | A1 | 7/2014 | Macready et al. | |
| 2014/0365201 | A1* | 12/2014 | Gao | G06F 40/44 704/2 |
| 2016/0314406 | A1 | 10/2016 | Wiebe et al. | |

OTHER PUBLICATIONS

Tanaka, Toshiyuki. "Information geometry of mean-field approximation." Neural Computation 12, No. 8 (2000): 1951-1968. (Year: 2000).*

Yapage, Nihal. "Information geometrical study of quantum Boltzmann machines." (2008). (Year: 2008).*

Brassard, Gilles, Peter Hoyer, Michele Mosca, and Alain Tapp. "Quantum amplitude amplification and estimation." Contemporary Mathematics 305 (2002): 53-74. (Year: 2002).*

First Office Action from Chinese Patent Application No. 201580066265. 4, dated Nov. 21, 2019, 5 pages (with English translation).

Bang, Jeongho, "Quantum-Classical Hybrid Learning-Simulator for Quantum-Algorithm Design," available at: http://iqoqi.at/en/events/event/983, 2 pages, retrieved on Oct. 30, 2014.

Bengio et al., "Greedy Layer-Wise Training of Deep Networks," *Advances in Neural Information Processing Systems* 19, 8 pages (Dec. 3, 2007).

Bian et al., "The Ising Model: Teaching an Old Problem New Tricks," Technical Report, D-Wave Systems, pp. 1-32 (Aug. 30, 2010).

Denil et al., "Toward the Implementation of a Quantum RBM," *NIPS'24 Workshop on Deep Learning and Unsupervised Feature Learning*, 9 pages (Dec. 16, 2011).

Dumoulin et al., "On the Challenges of Physical Implementations of RBMs," *Proceedings of the 28th AAAI Conference on Artificial Intelligence*, 7 pages (Jul. 27, 2014).

Dumoulin et al., "On the Challenges of Physical Implementations of RBMs," http://arxiv.org/abs/1312.5258v2, 7 pages (Oct. 24, 2014).

Fischer et al., "An Introduction to Restricted Boltzmann Machines," *LNCS*, 7441:14-36 (2012).

Herman, Joshua, "General Quantum Computational Networks Using Nonlinear Operators," available at: http://arxiv.org/abs/0709.0883v2, 4 pages (Sep. 7, 2007).

Hinton, Geoffrey, "A Practical Guide to Training Restricted Boltzmann Machines," *Momentum*, 9:1-20 (Aug. 2, 2010).

International Search Report and Written Opinion from International Patent Application No. PCT/US2015/062848, dated Mar. 14, 2016, 15 pages.

Jordan, Stephen, "Fast quantum algorithm for numerical gradient estimation," *Physical Review Letters*, 95:050501-1-050501-4 (Jul. 28, 2005).

Li et al., "A Hybrid Quantum-Inspired Neural Networks with Sequence Inputs," *Neurocomputing*, 117:81-90 (Mar. 4, 2013).

Resnik et al., "Gibbs Sampling for the Uninitiated," 23 pages (Jun. 2010).

Ricks et al., "Training a Quantum Neural Network," *Proceedings of the 17th Annual Conference of Neural Information Processing (NIPS' 16)*, 8 pages (Dec. 3, 2003).

Takahashi et al., "Multi-Layer Quantum Neural Network Controller Trained by Real-coded Genetic Algorithm," *Neurocomputing*, 134:159-164 (Jun. 25, 2014).

Tieleman, Tijmen, "Training Restricted Boltzmann Machines using Approximations to the Likelihood Gradient," *Proceedings of the 25th International Conference on Machine Learning*, pp. 1064-1071 (May 7, 2008).

U.S. Appl. No. 61/912,450, filed Dec. 5, 2013, 32 pages.

Vellasco et al., "Quantum-Inspired Evolutionary Algorithms Applied to Neural Network Modeling," available at: http://www-ma2.upc.edu/sxd/ICAIB/wcci2010-Plenary&InvitedLectures/wcci2010-ijcnn-Vellasco.pdf, pp. 125-150, retrieved on Oct. 30, 2014.

Welling et al., "A New Learning Algorithm for Mean Field Boltzmann Machines," *Proceedings of the International Conference on Artificial Neural Networks*, 10 pages (Jun. 5, 2001).

Wiebe et al., "Quantum Inspired Training for Boltzmann Machines," available at: http://arxiv.org/abs/1507.02642v1, pp. 1-18 (Jul. 9, 2015).

Zhou et al., "Deep Quantum Networks for Classification," *20th International Conference on Pattern Recognition*, 4 pages (Aug. 23, 2010).

Second Office Action issued in Chinese Patent Application No. 201580066265.4, dated Jul. 27, 2020, 11 pages (with English translation).

Communication pursuant to Article 94(3) EPC issued in European Patent Application No. 15813186.2, dated Jan. 26, 2021, 11 pages.

* cited by examiner

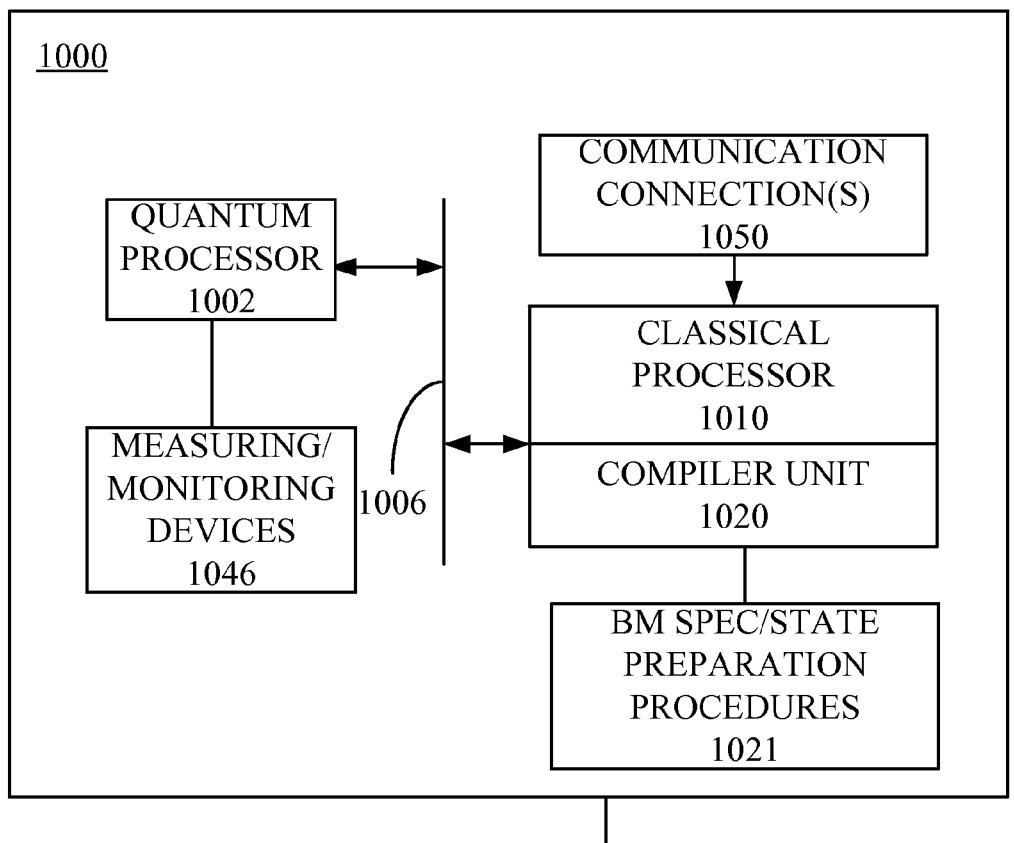
FIG. 10
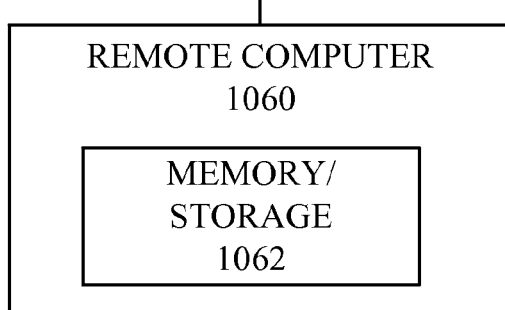

Input: Model weights $w$, visible biases $b$, hidden biases $d$, edge set $E$ and $x$, training vector $x$.
Output: Quantum state that can be measured to obtain the correct Gibbs state for a deep Boltzmann machine with the visible units clamped to $x$.

function qGENDATASTATE($w, b, d, E, \epsilon, x$)
  Compute vectors of mean-field parameters $\nu$ from $w$, $b$ and $d$ with visible units clamped to $x$.
  Compute the mean-field partition function $Z_{x,\mathrm{MF}}$.
  for $i = 1 : n_v$ do
    $\sum_h \sqrt{Q(x,h)} |x\rangle |h\rangle |E(x,h)\rangle \mapsto \sum_h \sqrt{Q(x,h)} |x\rangle |h\rangle |E(x,h) + x_i b_i\rangle$.
  end for
  for $j = 1 : n_h$ do
    $\sum_h \sqrt{Q(x,h)} |x\rangle |h\rangle |E(x,h)\rangle \mapsto \sum_h \sqrt{Q(x,h)} |x\rangle |h\rangle |E(x,h) + h_j d_j + \ln\left(\nu_j^{h_j}(1-\nu_j)^{1-h_j}\right)\rangle$.
  end for
  for $(i,j) \in E$ do
    $\sum_h \sqrt{Q(x,h)} |x\rangle |h\rangle |E(x,h)\rangle \mapsto \sum_h \sqrt{Q(x,h)} |x\rangle |h\rangle |E(x,h) + x_i h_j w_{i,j}\rangle$.
  end for
  $\sum_h \sqrt{Q(x,h)} |x\rangle |h\rangle |E(x,h)\rangle \mapsto \sum_h \sqrt{Q(x,h)} |x\rangle |h\rangle |E(x,h)\rangle \left(\sqrt{\frac{e^{-E(x,h)}}{Z_{x,\mathrm{MF}\kappa}}} |1\rangle + \sqrt{1 - \frac{e^{-E(x,h)}}{Z_{x,\mathrm{MF}\kappa}}} |0\rangle\right)$.
end function Table 1. Quantum algorithm for generating states that can be measured to estimate expectation values over model for training a deep Boltzmann machine.

FIG. 11A

Input: Model weights $w$, visible biases $b$, hidden biases $d$, edge set $E$ and $\kappa$, training vector $x$.
Output: Quantum state that can be measured to obtain the correct Gibbs state for a deep Boltzmann machine with the visible units clamped to $x$.

function qGENDATASTATE($w, b, d, E, \kappa, x$)
    Compute vectors of mean-field parameters $\nu$ from $w$, $b$ and $d$ with visible units clamped to $x$.
    Compute the mean-field partition function $Z_{x,MF}$.
    for $i = 1 : n_v$ do
        $\sum_h \sqrt{Q(x,h)} |x\rangle |h\rangle |E(x,h)\rangle \to \sum_h \sqrt{Q(x,h)} |x\rangle |h\rangle |E(x,h) + x_i b_i\rangle$.
    end for
    for $j = 1 : n_h$ do
        $\sum_h \sqrt{Q(x,h)} |x\rangle |h\rangle |E(x,h)\rangle \to \sum_h \sqrt{Q(x,h)} |x\rangle |h\rangle |E(x,h) + h_j d_j + \ln\left(\nu_j^{h_j}(1-\nu_j)^{1-h_j}\right)\rangle$.
    end for
    for $(i,j) \in E$ do
        $\sum_h \sqrt{Q(x,h)} |x\rangle |h\rangle |E(x,h)\rangle \to \sum_h \sqrt{Q(x,h)} |x\rangle |h\rangle |E(x,h) + x_i h_j w_{i,j}\rangle$.
    end for
    $\sum_h \sqrt{Q(x,h)} |x\rangle |h\rangle |E(x,h)\rangle \left(\sqrt{\frac{e^{-E(x,h)}}{Z_{x,MF}\kappa}}|1\rangle + \sqrt{1 - \frac{e^{-E(x,h)}}{Z_{x,MF}\kappa}}|0\rangle\right)$.
end function

Table 2. Quantum algorithm for generating states that can be measured to estimate expectation values over data for training a deep Boltzmann machine.

FIG. 11B

Input: Initial model weights $w$, visible biases $b$, hidden biases $d$, edge set $E$ and $\kappa$, a set of training vectors $x_{train}$, a regularization term $\lambda$ and a learning rate $r$.
Output: Three arrays containing gradients of weights, hidden biases and visible biases: gradMLw, gradMLb, gradMLd.

for $i = 1 : N_{train}$ do
  success ← 0
  while success = 0 do
    $|\psi\rangle$ ← qGenModelState($w, b, d, E, \kappa$)
    success ← result of measuring last qubit in $|\psi\rangle$
  end while
  modelVisibleUnits[$i$] ← result of measuring visible qubit register in $|\psi\rangle$.
  modelHiddenUnits[$i$] ← result of measuring hidden unit register in $|\psi\rangle$ using amplitude amplification.
  success ← 0
  while success = 0 do
    $|\psi\rangle$ ← qGenDataState($w, b, d, E, \kappa, x_{train}[i]$).
    success ← result of measuring last qubit in $|\psi\rangle$ using amplitude amplification.
  end while
  dataVisibleUnits[$i$] ← result of measuring visible qubit register in $|\psi\rangle$.
  dataHiddenUnits[$i$] ← result of measuring hidden unit register in $|\psi\rangle$.
end for
for each visible unit $i$ and hidden unit $j$ do
  gradMLw[$i,j$] ← $r\left(\langle v_i h_j\rangle_{data} - \langle v_i h_j\rangle_{model} - \lambda w_{i,j}\right)$.
  gradMLb[$j$] ← $r\left(\langle v_i\rangle_{data} - \langle v_i\rangle_{model}\right)$.
  gradMLd[$j$] ← $r\left(\langle h_j\rangle_{data} - \langle h_j\rangle_{model}\right)$.
end for

FIG. 12

Algorithm 4 Quantum algorithm for computing gradient of weights using amplitude estimation for use in training a deep Boltzmann machine.

Input: Initial model weights $w$, visible biases $b$, hidden biases $d$, edge set $E$ and $\kappa$, a set of training vectors $x_{train}$, a regularization term $\lambda$, $1/2 \geq \Delta > 0$, a learning rate $r$, and a specification of edge $(i,j)$.
Output: $r \frac{\partial O_{ML}}{\partial w_{i,j}}$ calculated to within error $2r\Delta$.

Call $U_O$ once to prepare state $|\psi\rangle \leftarrow \frac{1}{\sqrt{N_{train}}} \sum_{\psi \in x_{train}} |p\rangle |x_p\rangle$.

$|\psi\rangle \leftarrow$ qGenDataState$(w,b,d,E,\kappa,|\psi\rangle)$.   ▷ Apply Algorithm 2 using a superposition over $x_p$ rather than a single value.

Use amplitude estimation on state preparation process for $|\psi\rangle$ to learn $P(\{x_p\}_i = h_j = \text{success} = 1)$ within error $\Delta/8$.

Use amplitude estimation on state preparation process for $|\psi\rangle$ to learn $P(\text{success} = 1)$ within error $\Delta/8$.

$(v_i h_j)_{data} \leftarrow \frac{P(\{x_p\}_i = h_j = \text{success} = 1)}{P(\text{success} = 1)}$.

Use amplitude estimation in exact same fashion on qGenModelState$(w,b,d,E,\kappa)$ to learn $(v_i h_j)_{data}$.

$r \frac{\partial O_{ML}}{\partial w_{i,j}} \leftarrow r\left((v_i h_j)_{data} - (v_i h_j)_{model}\right)$ Table 4. Quantum procedure for computing gradient of weights using amplitude estimation for training a deep Boltzmann machine.

FIG. 13

QUANTUM DEEP LEARNING

CROSS REFERENCE TO RELATED APPLICATIONS

This is the U.S. National Stage of International Application No. PCT/US2015/062848, filed Nov. 28, 2015, which was published in English under PCT Article 2 1(2), which in turn claims the benefit of U.S. Provisional Application No. 62/088,409, filed Dec. 5, 2014. Both applications are incorporated herein in their entireties.

TECHNICAL FIELD

The disclosure pertains to training Boltzmann machines using quantum computers.

BACKGROUND

Deep learning is a relatively new paradigm for machine learning that has substantially impacted the way in which classification, inference and artificial intelligence (AI) tasks are performed. Deep learning began with the suggestion that in order to perform sophisticated AI tasks, such as vision or language, it may be necessary to work on abstractions of the initial data rather than raw data. For example, an inference engine that is trained to detect a car might first take a raw image and decompose it first into simple shapes. These shapes could form the first layer of abstraction. These elementary shapes could then be grouped together into higher level abstract objects such as bumpers or wheels. The problem of determining whether a particular image is or is not a car is then performed on the abstract data rather than the raw pixel data. In general, this process could involve many levels of abstraction.

Deep learning techniques have demonstrated remarkable improvements such as up to 30% relative reduction in error rate on many typical vision and speech tasks. In some cases, deep learning techniques approach human performance, such as in matching two faces. Conventional classical deep learning methods are currently deployed in language models for speech and search engines. Other applications include machine translation and deep image understanding (i.e., image to text representation).

Existing methods for training deep belief networks use contrastive divergence approximations to train the network layer by layer. This process is expensive for deep networks, relies on the validity of the contrastive divergence approximation, and precludes the use of intra-layer connections. The contrastive divergence approximation is inapplicable in some applications, and in any case, contrastive divergence based methods are incapable of training an entire graph at once and instead rely on training the system one layer at a time, which is costly and reduces the quality of the model. Finally, further crude approximations are needed to train a full Boltzmann machine, which potentially has connections between all hidden and visible units and may limit the quality of the optima found in the learning algorithm. Approaches are needed that overcome these limitations.

SUMMARY

The disclosure provides methods and apparatus for training deep belief networks in machine learning. The disclosed methods and apparatus permit efficient training of generic Boltzmann machines that are currently untrainable with conventional approaches. In addition, the disclosed approaches can provide more rapid training in fewer steps. Gradients of objective functions for deep Boltzmann machines are determined using a quantum computer in combination with a classical computer. A quantum state encodes an approximation to a Gibbs distribution, and sampling of this approximate distribution is used to determine Boltzmann machine weights and biases. In some cases, amplitude estimation and fast quantum algorithms are used. Typically, a classical computer receives a specification of a Boltzmann machine and associated training data, and determines an objective function associated with the Boltzmann machine. A quantum computer determines at least one gradient of the objective function, and based on the gradient of the objective function, at least one hidden value or a weight of the Boltzmann machine is established. A mean-field approximation can be used to define an objective function, and gradients can be determined based on the sampling.

These and other features of the disclosure are set forth below with reference to the accompanying drawings.

BRIEF DESCRIPTION OF THE DRAWINGS

FIG. 10 illustrates a representative classical computer that produces a quantum circuit arrangement that is coupled to a quantum processor so as to produce a quantum state that approximates a Gibbs distribution.

FIGS. 11A-11B illustrate a quantum algorithm for generating states that can be measured to estimate expectation values over model for training a deep Boltzmann machine.

FIG. 12 illustrates a representative method of computing gradients.

FIG. 13 illustrates a quantum procedure for computing gradient of weights using amplitude estimation for training a deep Boltzmann machine.

DETAILED DESCRIPTION

Figure 1:
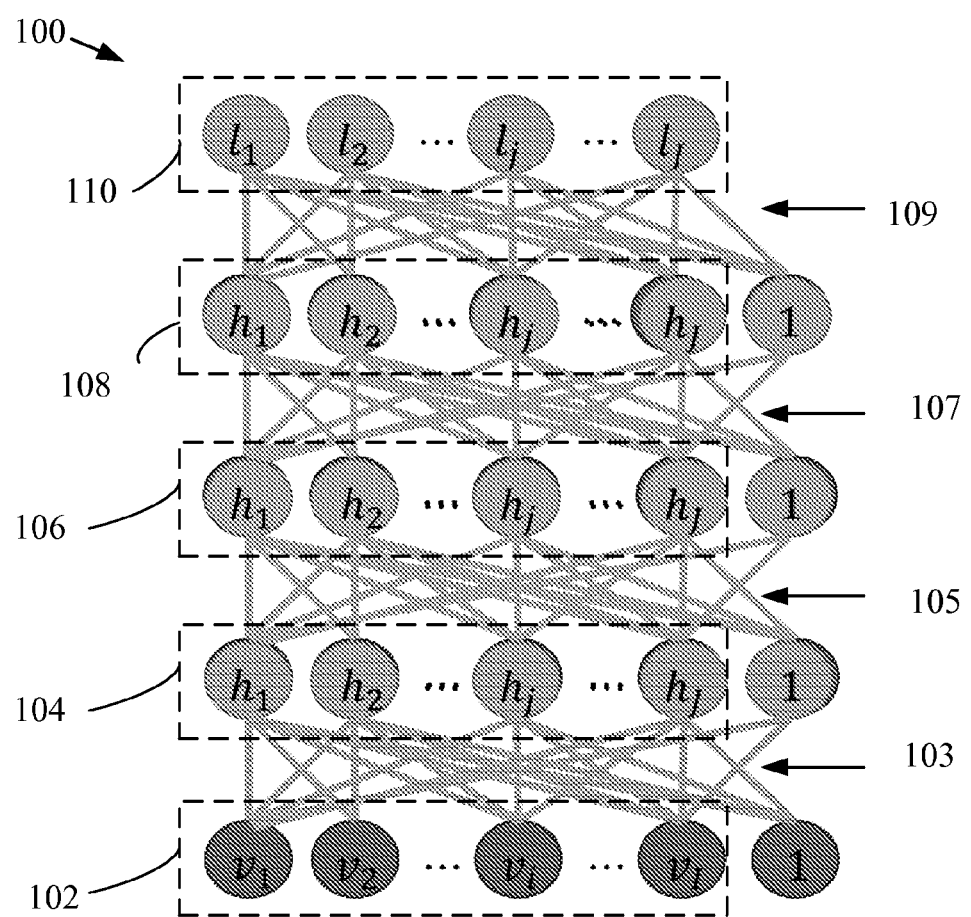
FIG. 1 illustrates a representative example of a deep Boltzmann machine.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatuses, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many functional alternatives can be made, and such selections need not be better, smaller, or otherwise preferable to other selections.

The methods and apparatus described herein generally use a classical computer coupled to a quantum computer to train a deep Boltzmann machine. In order for the classical computer to update a model for the deep Boltzmann machine given training data, certain expectation values are computed. A quantum computer is arranged to accelerate this process. In typical examples, a classically tractable approximation to the state provided by a mean field approximation, or a related approximation, is used to prepare a quantum state that is close to the distribution that yields the desired expectation values. The quantum computer is then used to efficiently refine this approximation into precisely the desired distribution. The required expectation values are then learned by sampling from this quantum distribution.

In alternative examples, amplitude estimation is used. Instead of preparing the quantum computer in a state corresponding to a single training vector, the state is prepared in a quantum superposition of every training example in the set Amplitude estimation is used to find the required expectation values.

Boltzmann Machines

The Boltzmann machine is a powerful paradigm for machine learning in which the problem of training a system to classify or generate examples of a set of training vectors is reduced to the problem of energy minimization of a spin system. The Boltzmann machine consists of several binary units that are split into two categories: (a) visible units and (b) hidden units. The visible units are the units in which the inputs and outputs of the machine are given. For example, if a machine is used for classification, then the visible units will often be used to hold training data as well as a label for that training data. The hidden units are used to generate correlations between the visible units that enable the machine either to assign an appropriate label to a given training vector or to generate an example of the type of data that the system is trained to output. FIG. 1 illustrates a deep Boltzmann machine 100 that includes a visible input layer 102 for inputs $v_i$, and output layer 110 for outputs and hidden unit layers 104, 106, 108 that couple the visible input layer 102 and the visible output layer 104. The layers 102, 104, 106, 108, 110 can be connected to an adjacent layer with connections 103, 105, 107, 109 but in a deep Boltzmann machine such as shown in FIG. 1, there are no intralayer connections. However, the disclosed methods and apparatus can be used to train Boltzmann machines with such intralayer connections, but for convenient description, training of deep Boltzmann machines is described in detail.

Formally, the Boltzmann machine models the probability of a given configuration (v, h) of hidden and visible units via the Gibbs distribution:

$$P(v,h) = e^{-E(v,h)}/Z$$

wherein Z is a normalizing factor known as the partition function, and v,h refer to visible and hidden unit values, respectively. The energy E of a given configuration of hidden and visible units is of the form:

$$E(v, h) = \sum_i v_i b_i - \sum_j h_j d_j - \sum_{i,j} w_{ij} v_i h_j,$$

wherein vectors v and h are visible and hidden unit values, vectors b and d are biases that provide an energy penalty for a hit taking a value of 1 and $w_{i,j}$ is a weight that assigns an energy penalty for the hidden and visible units both taking on a value of 1. Training a Boltzmann machine reduces to estimating these biases and weights by maximizing the log-likelihood of the training data. A Boltzmann machine for which the biases and weights have been determined is referred to as a trained Boltzmann machine. A so-called L2-regularization term can be added in order to prevent overfitting, resulting in the following form of an objective function:

$$O_{ML} := \frac{1}{N_{train}} \sum_{v \in x_{train}} \log\left(\sum_h P(v, h)\right) - \frac{\lambda}{2} w^T w.$$

This objective function is referred to as a maximum likelihood-objective (ML-objective) function and $\lambda$ represents the regularization term. Gradient descent provides a method to find a locally optimal value of the ML-objective function. Formally, the gradients of this objective function can be written as:

$$\frac{\partial O_{ML}}{\partial w_{ij}} = \langle v_i h_j \rangle_{data} - \langle v_i h_j \rangle_{model} - \lambda w_{i,j} \quad (1a)$$

$$\frac{\partial O_{ML}}{\partial b_i} = \langle v_i \rangle_{data} - \langle v_i \rangle_{model} \quad (1b)$$

-continued $$\frac{\partial O_{ML}}{\partial d_j} = \langle h_j \rangle_{data} - \langle h_j \rangle_{model}. \quad (1c)$$

The expectation values for a quantity x(v,h) are given by:

$$\langle x \rangle_{data} = \frac{1}{N_{train}} \sum_{v \in x_{train}} \sum_h \frac{x(v,h)e^{-E(v,h)}}{Z_v},$$

wherein $Z_v = \sum_h e^{-E(v,h)}$, and $$\langle x \rangle_{model} = \sum_{v,h} \frac{x(v,h)e^{-E(v,h)}}{Z},$$

wherein $Z = \sum_{v,h} e^{-E(v_{data},h)}$.

Note that it is non-trivial to compute any of these gradients: the value of the partition function Z is #P-hard to compute and cannot generally be efficiently approximated within a specified multiplicative error. This means modulo reasonable complexity theoretic assumptions, neither a quantum nor a classical computer should be able to directly compute the probability of a given configuration and in turn compute the log-likelihood of the Boltzmann machine yielding the particular configuration of hidden and visible units.

In practice, approximations to the likelihood gradient via contrastive divergence or mean-field assumptions have been used. These conventional approaches, while useful, are not fully theoretically satisfying as the directions yielded by the approximations are not the gradients of any objective function, let alone the log-likelihood. Also, contrastive divergence does not succeed when trying to train a full Boltzmann machine which has arbitrary connections between visible and hidden units. The need for such connections can be mitigated by using a deep restricted Boltzmann machine (shown in FIG. 1) which organizes the hidden units in layers, each of which contains no intra-layer interactions or interactions with non-consecutive layers. The problem with this is that conventional methods use a greedy layer by layer approach to training that becomes costly for very deep networks with a large number of layers. Disclosed herein are methods and apparatus based on quantum computation for training deep restricted Boltzmann machines, without relying on the contrastive divergence approximation. The disclosed methods can be used with Boltzmann machines in general, and are not restricted to deep restricted Boltzmann machines. The approaches disclosed below are suitable for any objective function that can be efficiently computed based on sampling from a Gibbs Distribution.

Boltzmann machines can be used in a variety of applications. In one application, data associated with a particular image, a series of images such as video, a text string, speech or other audio is provided to a Boltzmann machine (after training) for processing. In some cases, the Boltzmann provides a classification of the data example. For example, a Boltzmann machine can classify an input data example as containing an image of a face, speech in a particular language or from a particular individual, distinguish spam from desired email, or identify other patterns in the input data example such as identifying shapes in an image. In other examples, the Boltzmann machine identifies other features in the input data example or other classifications associated with the data example. In still other examples, the Boltzmann machine preprocesses a data example so as to extract features that are to be provide to a subsequent Boltzmann machine. In typical examples, a trained Boltzmann machine can process data examples for classification, clustering into groups, or simplification such as by identifying topics in a set of documents. Data input to a Boltzmann machine for processing for these or other purposes is referred to as a data example. In some applications, a trained Boltzmann machine is used to generate output data corresponding to one or more features or groups of features associated with the Boltzmann machine. Such output data is referred to as an output data example. For example, a trained Boltzmann machine associated with facial recognition can produce an output data example that is corresponding to a model face.

Quantum Algorithm for State Preparation

Quantum computers can draw unbiased samples from the Gibbs distribution, thereby allowing probabilities to be computed by sampling (or by quantum sampling). As disclosed herein, a quantum distribution is prepared that approximates the ideal probability distribution over the model or data. This approximate distribution is then refined by rejection sampling into a quantum distribution that is, to within numerical error, the target probability distribution. Layer by layer training is unnecessary, and approximations required in conventional methods can be avoided. Beginning with a uniform prior over the amplitudes of the Gibbs state, preparing the state via quantum rejection sampling is likely to be inefficient. This is because the success probability depends on a ratio of the partition functions of the initial state and the Gibbs state which is generally exponentially small for machine learning problems. In some examples, a mean-field approximation is used over the joint probabilities in the Gibbs state, rather than a uniform prior. This additional information can be used to boost the probability of success to acceptable levels for numerically tractable examples.

The required expectation values can then be found by sampling from the quantum distribution. A number of samples needed to achieve a fixed sampling error can be quadratically reduced by using a quantum algorithm known as amplitude estimation.

Disclosed below are methods by which an initial quantum distribution is refined into a quantum coherent Gibbs state (often called a coherent thermal state or CTS). Mean-field approaches or generalizations thereof can be used to provide suitable initial states for the quantum computer to refine into the CTS. All units are assumed to be binary-valued in the following examples, but other units (such as Gaussian units) can be approximated within this framework by forming a single unit out of a string of several qubits.

Mean-Field Approximation

The mean-field approximation to the joint probability distribution is referred to herein as Q (v,h). The mean-field approximation is a variational approach that finds an uncorrelated distribution Q (v,h) that has minimal Kullback-Leibler (KL) divergence with the joint probability distribution P(v,h) given by the Gibbs distribution. The main benefit of using Q instead of P is that $\langle v_i h_j \rangle_{model}$ and log(Z) can be efficiently estimated using mean-field approximations. A secondary benefit is that the mean-field state can be efficiently prepared using single-qubit rotations.

More concretely, the mean-field approximation is a distribution such that $$Q(v, h) = \left(\prod_i \mu_i^{v_i}(1-\mu_i)^{1-v_i}\right)\left(\prod_j v_j^{h_j}(1-v_j)^{1-h_j}\right),$$

where $\mu_i$ and $v_j$ are chosen to minimize $KL(Q\|P)$. The parameters $\mu_i$ and $v_j$ are called mean-field parameters.

Using the properties of the Bernoulli distribution, it can be shown that:

$$KL(Q\|P) = \sum_{v,h} -Q(v,h)\ln(P(v,h)) + Q(v,h)\ln(Q(v,h)),$$

$$= \sum_{v,h} Q(v,h)\left(\sum_i v_i b_i + \sum_j h_j d_j + \sum_{i,j} w_{i,j} v_i h_j + \ln Z\right) +$$

$$Q(v,h)\ln(Q(v,h)),$$

$$= \sum_i \mu_i b_i + \sum_j v_j d_j + \sum_{i,j} w_{i,j} \mu_i v_j + \ln(Z) + \sum_i \mu_i \ln(\mu_i) +$$

$$(1-\mu_i)\ln(1-\mu_i) + \sum_j v_j \ln(v_j) + (1-v_j)\ln(1-v_j).$$

The optimal values of $\mu_i$ and $v_j$ are can be found by differentiating this equation with respect to $\mu_i$ and $v_j$ are and setting the result equal to zero. The solution to this is $$\mu_i = \sigma\left(-b_i - \sum_j w_{i,j} v_j\right)$$

$$v_j = \sigma\left(-d_j - \sum_i w_{i,j} \mu_i\right),$$

wherein $\sigma(x)=1/(1+\exp(-x))$ is the sigmoid function.

These equations can be implicitly solved by fixed point iteration, which involves initializing the $\mu_i$ and $v_3$ arbitrarily and iterating until convergence is reached. Convergence is guaranteed provided that the norm of the Jacobian of the map is bounded above by 1. Solving the mean-field equations by fixed point iteration is analogous to Gibbs sampling with the difference being that here there are only a polynomial number of configurations to sample over and so the entire process is efficient.

Mean-field approximations to distributions such $P(v,h)=\delta_{v,x}\exp^{-E(x,h)}/Z_x$ can be computed using the exact same methodology. The only difference is that in such cases the mean-field approximation is only taken over the hidden units. Such approximations are needed to compute the expectations over the data that are needed to estimate the derivatives of $O_{ML}$ used below. It can also be shown that among all product distributions, Q is the distribution that leads to the least error in the approximation to the log-partition function.

Experimentally, mean-field approximations can estimate the log-partition function within less than 1% error, depending on the weight distribution and the geometry of the graph used. The mean-field approximation to the partition function is sufficiently accurate for small restricted Boltzmann machines. Structured mean-field approximation methods can be used to reduce such errors if needed, albeit at a higher classical computational cost. It can be shown that the success probability of the disclosed state preparation methods approach unity in the limit in which the strengths of the correlations in the model vanish.

The mean-field distribution is used to compute a variational approximation to the necessary partition functions. These approximations are shown below. If Q is the mean-field approximation to the Gibbs distribution P, then a mean field partition function $Z_{MF}$ is defined as:

$$Z_{MF} := \sum_{v,h} Q(v,h)\log\left(\frac{e^{-E(v,h)}}{Q(v,h)}\right).$$

Furthermore, for any $x \in x_{train}$, let $Q_x$ be the mean-field approximation to the Gibbs distribution found for a Boltzmann machine with the visible units clamped to x and further define $Z_{x,MF}$ as:

$$Z_{x,MF} := \sum_h Q_x(x,h)\log\left(\frac{e^{-E(x,h)}}{Q_x(x,h)}\right).$$

To use a quantum algorithm to prepare P from Q, an upper bound $\kappa$ on the ratio of the approximation $P(v,h) \approx e^{-E(v,h)}/Z_{MF}$ to $Q(v,h)$ is needed. Let $\kappa > 0$ be a constant that satisfies for all visible and hidden configurations (v,h):

$$\frac{e^{-E(v,h)}}{Z_{MF}} \le \kappa Q(v,h),$$

wherein $Z_{MF}$ is the approximation to the partition function given above. Then for all configurations of hidden and visible units, $$P(v,h) \le \frac{e^{-E(v,h)}}{Z_{MF}} \le \kappa Q(v,h).$$

The mean-field approximation can also be used to provide a lower bound for the log-partition function. For example, Jensen's inequality can be used to show that $$\log(Z) = \log\left(\sum_{v,h} \frac{Q(v,h)e^{-E(v,h)}}{Q(v,h)}\right) \ge \sum_{v,h} Q(v,h)\log\left(\frac{e^{-E(v,h)}}{Q(v,h)}\right) = \log(Z_{MF}).$$

Thus, $Z_{MF} \le Z$ and $P(v,h) \le e^{-E(v,h)}/Z_{MF}$.

A coherent analog of the Gibbs state for a Boltzmann machine can be prepared with a probability of success of $$\frac{Z}{\kappa Z_{MF}}.$$

Similarly, the Gibbs state corresponding to the visible units being clamped to a configuration x can be prepared with success probability $$\frac{Z_x}{\kappa_x Z_{x,MF}}.$$

The mean-field parameters $\mu_i$ and $v_j$ can be determined as shown above and uniquely specify the mean-field distribution Q. The mean-field parameters are then used to approximate the partition functions Z and $Z_x$ prepare a coherent analog of Q(v,h), $|\psi_{MF}\rangle$, by performing a series of single-qubit rotations:

$$|\psi_{MF}\rangle := \prod_i R_y(2\arcsin(\sqrt{\mu_i}))|0\rangle \prod_j R_y(2\arcsin(\sqrt{v_j}))|0\rangle = \sum_{v,h} |v\rangle|h\rangle\sqrt{Q(v,h)}.$$

Rejection sampling can be used to refine this approximation to $$\sum_{v,h} |v\rangle|h\rangle\sqrt{P(v,h)}.$$

Define $$P(v,h) := \frac{e^{-E(v,h)}}{\kappa Z_{MF} Q(v,h)}.$$

Note that this quantity can be computed efficiently from the mean-field parameters and so there is an associated efficient quantum circuit, and $0 \le P(v,h) \le 1$.

Since quantum operations are linear, if this is applied to a state $$\sum_v \sum_h \sqrt{Q(v,h)} |v\rangle|h\rangle|0\rangle,$$

the state $$\sum_v \sum_h \sqrt{Q(v,h)} |v\rangle|h\rangle|P(v,h)\rangle,$$

is obtained. An additional quantum bit is added, and a controlled rotation of the form $R_y(2 \sin^{-1}(P(v,h)))$ is performed on this qubit to enact the following transformation:

$$\sum_{v,h} \sqrt{Q(v,h)} |v\rangle|h\rangle|P(v,h)\rangle|0\rangle \mapsto$$
$$\sum_{v,h} \sqrt{Q(v,h)} |v\rangle|h\rangle|P(v,h)\rangle(\sqrt{1-P(v,h)}|0\rangle + \sqrt{P(v,h)}|1\rangle).$$

The register that contains the qubit string P(v,h) is then reverted to the $|0\rangle$ state by applying the same operations used to prepare P(v,h) in reverse. This process is possible because all quantum operations, save measurement, are reversible. Since $P(v,h) \in [0,1]$, this is a properly normalized quantum state and its square is a properly normalized probability distribution. If the rightmost quantum bit is measured and a result of 1 is obtained (projective measurements always result in a unit vector) then the remainder of the state will be proportional to $$\sum_{v,h} \sqrt{Q(v,h)P(v,h)} = \sqrt{\frac{Z}{\kappa Z_{MF}}} \sum_{v,h} \sqrt{\frac{e^{-E(v,h)}}{Z}} |v\rangle|h\rangle = \sqrt{\frac{Z}{\kappa Z_{MF}}} \sum_{v,h} \sqrt{P(v,h)} |v\rangle|h\rangle,$$

which is the desired state up to a normalizing factor. The probability of measuring 1 is the square of this constant of proportionality:

$$P(1|\kappa, Z_{MF}) = \frac{Z}{\kappa Z_{MF}}.$$

Preparing a quantum state that can be used to estimate the expectation values over the data requires a slight modification to this algorithm. First, for each $x \in x_{train}$ needed for the expectation values, Q(v,h) is replaced with the constrained mean-field distribution $Q_x(x,h)$. Then using this data, the quantum state $$\sum_h \sqrt{Q_x(x,h)} |x\rangle|h\rangle$$

can be prepared. The same procedure is can be followed using $Q_x$ in place of Q, $Z_x$ instead of Z, and $Z_{x,MF}$ rather than $Z_{MF}$. The success probability of this algorithm is:

$$P(1|\kappa, Z_{x,MF}) = \frac{Z_x}{\kappa_x Z_{x,MF}},$$

wherein $\kappa_x$ is the value of $\kappa$ that corresponds to the case where the visible units are clamped to x.

This approach to state preparation problem uses a mean-field approximation rather than an infinite temperature Gibbs state as an initial state. This choice of initial state is important because the success probability of the state preparation process depends on the distance between the initial state and the target state. For machine learning applications, the inner product between the Gibbs state and the infinite temperature Gibbs state is often exponentially small; whereas the mean-field and Gibbs states typically have large overlaps.

As shown below, if an insufficiently large value of $\kappa$ is used, then the state preparation algorithm can still be used, but at the price of reduced fidelity with the ideal coherent Gibbs state. Using relaxed assumptions, such that $\kappa Q(v,h) \ge e^{-E(v,h)}/Z_{MF}$ for all $(v,h) \in$ good, $\kappa Q(v,h) < e^{-E(v,h)}/Z_{MF}$ for all $j \in$ bad, and $$\sum_{(v,h) \in bad} (e^{-E(v,h)} - Z_{MF}\kappa Q(v,h)) \le \delta Z,$$

then a state can be prepared that has fidelity at least $1-\delta$ with the target Gibbs state with probability at least $Z(1-\delta)/(\kappa Z_{MF})$.

Prior to the measurement of the register that projects the state onto the success or failure branch, the state is:

$$\sum_{(v,h)\in good} \sqrt{Q(v,h)}\,|v\rangle|h\rangle\left(\sqrt{\frac{e^{-E(v,h)}}{Z_{MF}\kappa Q(v,h)}}|1\rangle + \sqrt{1 - \frac{e^{-E(v,h)}}{Z_{MF}\kappa Q(v,h)}}|0\rangle\right) + \sum_{(v,h)\in bad}\sqrt{Q(v,h)}\,|v\rangle|h\rangle|1\rangle.$$

The probability of successfully preparing the approximation to the state is then:

$$\sum_{(v,h)\in good}\frac{e^{-E(v,h)}}{\kappa Z_{MF}} + \sum_{(v,h)\in bad}Q(v,h) = \frac{Z - \left(\sum_{(v,h)\in bad}e^{-E(v,h)} - \sum_{(h,v)\in bad}\kappa Z_{MF}Q(v,h)\right)}{Z_{MF}\kappa} \geq \frac{Z(1-\delta)}{\kappa Z_{MF}}.$$

The fidelity of the resultant state with the ideal state $$\sum_{v,h}\sqrt{e^{-E(v,h)}/Z}\,|v\rangle|h\rangle$$

is:

$$\frac{\sum_{(v,h)\in good}e^{-E(v,h)} + \sum_{(v,h)\in bad}\sqrt{Q(v,h)Z_{MF}\kappa e^{-E(v,h)}}}{\sqrt{Z\left(\sum_{(v,h)\in good}e^{-E(v,h)} + \sum_{(v,h)\in bad}Q(v,h)\right)}} \geq$$

$$\frac{\sum_{(v,h)\in good}e^{-E(v,h)} + \sum_{(v,h)\in bad}Q(v,h)}{\sqrt{Z\left(\sum_{(v,h)\in good}e^{-E(v,h)} + \sum_{(v,h)\in bad}Q(v,h)\right)}},$$

since $Q(v,h)Z_{MF}\kappa \leq e^{-E(v,h)}$ and $(v,h)\in bad$. Using the assumption that $$\sum_{(v,h)\in bad}(e^{-E(v,h)} - Z_{MF}\kappa Q(v,h)) \leq \delta Z,$$

the fidelity is bounded above by:

$$\frac{\sqrt{\sum_{(v,h)\in good}e^{-E(v,h)} + \sum_{(v,h)\in bad}Q(v,h)}}{\sqrt{Z}} \geq \sqrt{1-\delta} \geq 1-\delta.$$

Procedures for producing states that can be measured to estimate expectation values over the model and the data for training a deep Boltzmann machine are shown in Tables 1-2, respectively (as shown in FIGS. 11A-11B).

Gradient Calculation by Sampling

One method for estimating the gradients of $O_{ML}$ involves preparing the Gibbs state from the mean-field state and then drawing samples from the resultant distribution in order to estimate the expectation values required in Eqns. (1a)-(1c) above. This approach can be improved using the quantum method known as amplitude amplification, a generalization of Grover's search algorithm that quadratically reduces the mean number of repetitions needed to draw a sample from the Gibbs distribution using the methods discussed above.

There exists a quantum algorithm that can estimate the gradient of $O_{ML}$ using $N_{train}$ samples for a Boltzmann machine on a connected graph with E edges. The mean number of quantum operations required by algorithm to compute the gradient is $$\tilde{O}\left(N_{train}E\sqrt{\kappa + \sum_{v\in x_{train}}\kappa_v}\right),$$

wherein $\kappa_v$ is the value of $\kappa$ that corresponds to the Gibbs distribution when the visible units are clamped to v and $f\in\tilde{O}(g)$ implies $f\in O(g)$ up to polylogarithmic factors.

Table 3 (as shown in FIG. 12) illustrates a representative method of computing gradients. The procedure qGenModelState and qGenDataState (shown in Tables 1 and 2, respectively) represent the only quantum processing in this method. It can be shown that the expected cost of the method of Table 3 is $\tilde{O}(N_{train}E\sqrt{\kappa+\max_v\kappa_v})$.

In contrast, the number of operations and queries to $U_O$ required to estimate the gradients using greedy layer by layer optimization scales as $\tilde{O}(N_{train}\ell E)$, wherein $\ell$ is the number of layers in the deep Boltzmann machine. Assuming that $\kappa$ is a constant, it follows that a quantum sampling approach provides an asymptotic advantage for training deep networks. In practice, the two approaches are difficult to directly compare because they both optimize different objective functions and thus the qualities of the resultant trained models will differ. It is reasonable to expect, however, that the quantum approach will tend to find superior models because it optimizes the maximum likelihood objective function up to sampling error due to taking finite $N_{train}$.

Note that the method of Table 3 has an important advantage over typical quantum machine learning algorithms in that it does not require that the training vectors be stored in quantum memory. Instead, only $$n_v + n_h + 1 + 2\log\left(\frac{1}{\epsilon}\right)$$

qubits are needed for a numerical precision of $\epsilon$ in the evaluation of the energy and $Q(v,h)$. This means that an algorithm that could not be done classically could be performed with fewer than 100 qubits, assuming that 32-bits of precision suffices for the energy and $Q(v,h)$. Recent developments in quantum rotation synthesis could be used to remove the requirement that the energy is explicitly stored as a qubit string which might substantially reduce space requirements. An alternative method is disclosed below in which the quantum computer can coherently access this database via an oracle.

Training Via Quantum Amplitude Estimation

An alternative method is based on access to the training data via a quantum oracle which could represent either an efficient quantum algorithm that provides the training data (such as another Boltzmann machine used as a generative model) or a quantum database that stores the memory via a binary access tree. If the training set is $\{x_i|i=1,\ldots,N_{train}\}$, then the oracle is a unitary operation $U_O$ that, for any computational basis state $|i\rangle$ and any bit strings y and $x_i$ of length $n_v$, the operation:

$$U_O|i\rangle|y\rangle := |i\rangle|y \oplus x_i\rangle,$$

A single quantum access to $U_O$ is sufficient to prepare a uniform distribution over all the training data:

$$U_O\left(\frac{1}{\sqrt{N_{train}}} \sum_{i=1}^{N_{train}} |i\rangle|0\rangle\right) = \frac{1}{\sqrt{N_{train}}} \sum_{i=1}^{N_{train}} |i\rangle|x_i\rangle$$

The state $$\frac{1}{\sqrt{N_{train}}} \sum_{i=1}^{N_{train}} |i\rangle|0\rangle$$

can be efficiently prepared using quantum techniques so the entire procedure is efficient.

At first glance, the ability to prepare a superposition over all data from the training set seems to be a powerful resource. However, a similar probability distribution can be generated classically using one query by picking a random training vector. More sophisticated approaches are needed if to leverage computational advantages using such quantum superpositions. The method shown in Table 4 (as shown in FIG. 13) uses such superpositions to provide such advantages for computing gradients of objective functions, under certain circumstances. It can be demonstrated that there exists a quantum algorithm that can compute $$r\frac{\partial O_{ML}}{\partial w_{ij}}, r\frac{\partial O_{ML}}{\partial b_i}, \text{ or } r\frac{\partial O_{ML}}{\partial d_j}$$

for a Boltzmann machine on a connected graph with E edges to within error $\delta$ using an expected number of queries to $U_O$ that scales as $$\tilde{O}\left(\frac{\kappa + \max_v \kappa_v}{\delta}\right)$$

and a number of quantum operations that scales as $$\tilde{O}\left(\frac{E(\kappa + \max_v \kappa_v)}{\delta}\right)$$

for a constant learning rate r.

The method of computing gradients for a deep Boltzmann machine shown in Table 4 uses amplitude estimation. This method provides a quadratic reduction in the number of samples needed to learn the probability of an event occurring. For any positive integer L, the amplitude estimation algorithm of takes as input a quantum algorithm that does not use measurement and with success probability a and outputs $\tilde{a}(0 \leq \tilde{a} \leq 1)$ such that $$|\tilde{a} - a| \leq \frac{\pi(\pi+1)}{L}$$

with probability at least $8/\pi^2$, using L iterations of Grover's algorithm. If a=0, then $\tilde{a}=0$ with certainty, and if a=1 and L is even, then $\tilde{a}=1$ with certainty. Amplitude estimation is described in further detail in Brassard et al. "Quantum amplitude amplification and estimation," available at arxiv.org/quanth-ph/0005055 v1 (2000), which is incorporated herein by reference.

The procedure of Table 4 provides a method for computing the derivative of $O_{ML}$ with respect to the weights. This procedure can be adapted to compute the derivatives with respect to the biases. The first step in this procedure is preparation of a uniform superposition of all training data and then applying $U_0$ to the superposition to obtain:

$$\frac{1}{\sqrt{N_{train}}} \sum_{p=1}^{N_{train}} |p\rangle|x_p\rangle.$$

Any quantum algorithm that does not use measurement is linear and hence applying qGenDataState (shown in Table 2 above) to this superposition yields:

$$\frac{1}{\sqrt{N_{train}}} \sum_{p=1}^{N_{train}} |p\rangle|x_p\rangle$$

$$\sum_h \sqrt{Q(x_p, h)} |h\rangle|P(x_p, h)\rangle \left(\sqrt{1 - P(x_p, h)}|0\rangle + \sqrt{P(x_p, h)}|1\rangle\right) :=$$

$$\frac{1}{\sqrt{N_{train}}} \sum_{p=1}^{N_{train}} |p\rangle|x_p\rangle \sum_h \sqrt{Q(x_p, h)} |h\rangle|P(x_p, h)\rangle|\chi(x_p, h)\rangle.$$

If a measurement X=1 is success then $\tilde{O}((\kappa + \max_v \kappa_v)/\Delta)$ preparations are needed to learn P(success)=P(x=1) to within relative error $\Delta/8$ with high probability. This is because $P(success) \geq 1/(\kappa + \max_v \kappa_v)$. Similarly, success can be associated with an event in which an $i^{th}$ visible unit is 1 and the $j^{th}$ hidden unit is 1 and a successful state preparation is measured. This marking process is exactly the same as the previous case, but requires a Toffoli gate (a doubly-controlled NOT gate, which can be implemented using fundamental gates) and two Hadamard operations. Thus $P(v_i=h_j=x=1)$ can be learned within relative error $\Delta/8$ using $\tilde{O}((\kappa + \max_v \kappa_v)/\Delta)$ preparations. It then follows from the laws of conditional probability that $$\langle v_i h_j \rangle_{data} = P([x_p]_i = h_j = 1 | \chi = 1) = \frac{P([x_p]_i = h_j = \chi = 1)}{P(\chi = 1)} \quad (2)$$

can be calculated.

In order to ensure that the total error in $\langle v_i h_j \rangle_{data}$ is at most $\Delta$, the error in the quotient in (2) must be bounded. It can be seen that for $\Delta < 1/2$, $$\left| \frac{P([x_i]_j = h_k = \chi = 1)(1 \pm \Delta/8)}{P(\chi = 1)(1 \pm \Delta/8)} - \frac{P([x_i]_j = h_k = \chi = 1)}{P(\chi = 1)} \right| \leq$$

-continued $$\frac{\Delta P([x_i]_j = h_k = \chi = 1)}{P(\chi = 1)} \leq \Delta.$$

Therefore the algorithm gives $\langle v_i h_j \rangle_{data}$ within error $\Delta$.

The same steps can be repeated using qGenModelState (Table 1) as the state preparation subroutine used in amplitude estimation. This allows computation of $\langle v_i h_j \rangle_{data}$ within error $\Delta$ using $\tilde{O}(1/\Delta)$ state preparations. The triangle inequality shows that the maximum error incurred from approximating $\langle v_i h_j \rangle_{data} - (v_i h_j)_{model}$ is at most $2\Delta$. Therefore, with a learning rate of r, the overall error in the derivative is at most $2\Delta r$. If $\Delta = \delta/(2r)$ then the overall algorithm requires $\tilde{O}(1/\delta)$ state preparations for constant r.

Each state preparation requires one query to $U_O$ and $\tilde{O}(E)$ operations assuming that the graph that underlies the Boltzmann machine is connected. This means that the expected query complexity of the algorithm is $\tilde{O}((\kappa + \max_v \kappa_v)/\delta)$ and the number of circuit elements required is $\tilde{O}((\kappa + \max_v \kappa_v)E/\delta)$.

There are two qualitative differences between the method of Table 4 and that of Table 3. First, the method of Table 4 provides detailed information about one direction of the gradient, whereas samples produced by the method of Table 3 provide limited information about every direction. The method of Table 4 can be repeated for each of the components of the gradient vector in order to perform an update of the weights and biases of the Boltzmann machine. Second, amplitude amplification is not used to reduce the effective value of $\kappa$. Amplitude amplification only gives a quadratic advantage if used in an algorithm that uses measurement and feedback unless the probability of success is known.

The quadratic scaling with E means that the method of Table 4 may not be preferable to that of Table 3 for learning all weights. On the other hand, the method of Table 4 can be used to improve previously estimated gradients. In one example, a preliminary gradient estimation step is performed using a direct gradient estimation method using $O(\sqrt{N_{train}})$ randomly selected training vectors. Then the gradient is estimated by breaking the results into smaller groups and computing the mean and the variance of each component of the gradient vector over each of the subgroups. The components of the gradients with the largest uncertainty can then be learned using the above method with $\delta \sim 1/\sqrt{N_{train}}$. This approach allows the benefits of different approaches to be used, especially in cases where the majority of the uncertainty in the gradient comes from a small number of components.

The discussion above is directed to learning on restricted Boltzmann machines and deep Boltzmann machines. The disclosed quantum methods can train full Boltzmann machines given that the mean-field approximation to the Gibbs state has only polynomially small overlap with the true Gibbs state. The intra-layer connections associated with such Boltzmann machines can permit superior models.

Example Implementations

Figure 2:
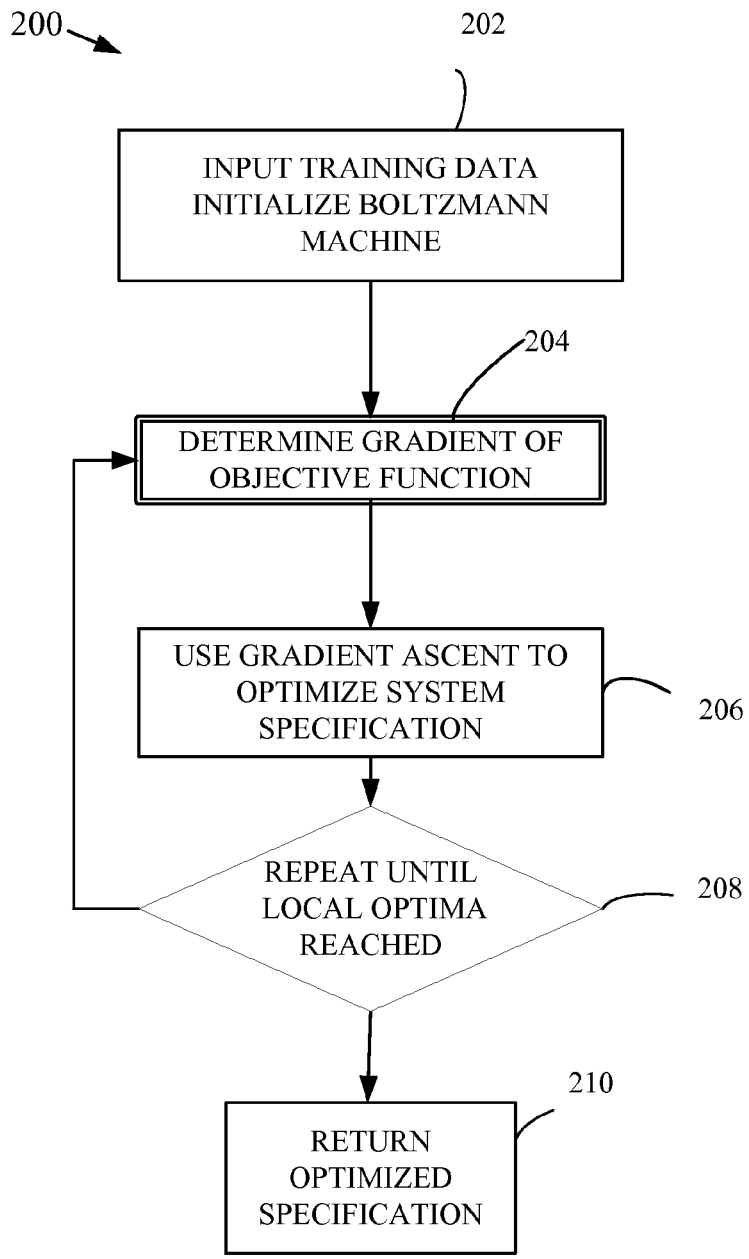
FIG. 2 illustrates a representative method of training a Boltzmann machine, typically based on an objective function associated with a log-likelihood.

With reference to FIG. 2, a method 200 of training a Boltzmann machine includes providing training data and initializing at 202. At 204, a gradient of an objective function is determined with a quantum computer, and at 206, gradient ascent is used to refine the Boltzmann machine. If a local optimum is reached as determined at 208, an optimized Boltzmann machine specification is returned at 210. Otherwise, additional quantum processing is executed at 204.

Figure 3:
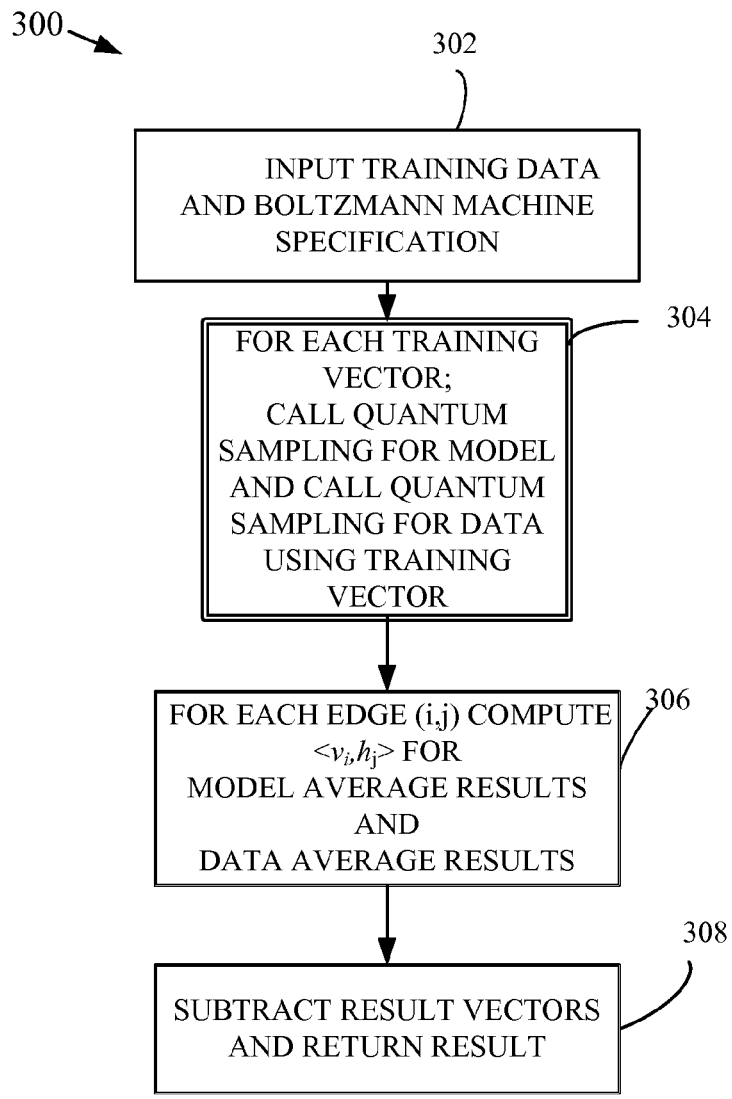
FIG. 3 illustrates a method of gradient calculation for a deep Boltzmann machine using quantum-based sampling.

A method 300 of gradient calculation is illustrated in FIG. 3. At 302, training data and an initial Boltzmann machine specification (such as numbers of layers, and numbers of units in each layer) are provided. At 304, a quantum-based sampling algorithm (such as that of Table 1 or Table 2 for example) is carried out for the selected model and data expectation using a training vector. At 306, visible unit and hidden unit values $(v_i, h_j)$ are determined for each edge specified by (i,j) for a model average and a data average. At 308, the result vectors are subtracted, and the result returned.

Figure 4:
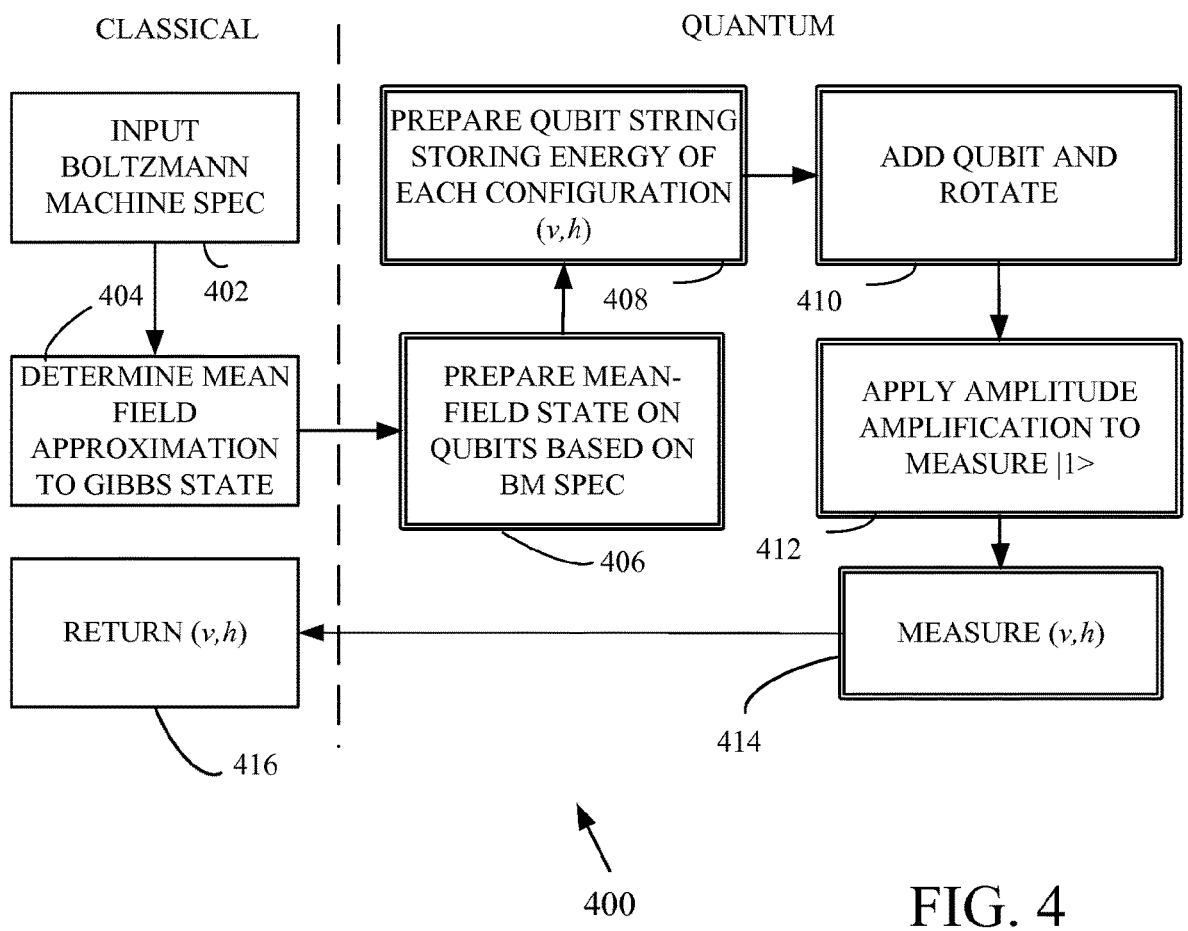
FIG. 4 illustrates a method of quantum-based sampling for determining a model average for use in training a Boltzmann machine using quantum computation.

Referring to FIG. 4, a method 400 of establishing and sampling a model average includes receiving a Boltzmann machine specification at 402 and computing a mean field approximation to a Gibbs state at 404. At 406, the mean-field values are used to prepare a mean-field state on qubits in a quantum computer and at 408, a qubit string is prepared that stores energy of each configuration (v,h). This qubit string can be represented as $$\sum_{v,h} a(v, h) |v, h\rangle |E(v, h)\rangle.$$

At 410, a qubit is added, and quantum superposition is used rotate the qubit to $$\frac{\sqrt{P(v, h)}}{a(v, h)} |1\rangle + \sqrt{1 - \frac{P(v, h)}{a^2(v, h)}} |0\rangle.$$

At 412, amplitude estimation is used to measure $|1\rangle$ and at 414, (v,h) is measured. The measured value (v,h) is returned at 416.

Figure 5:
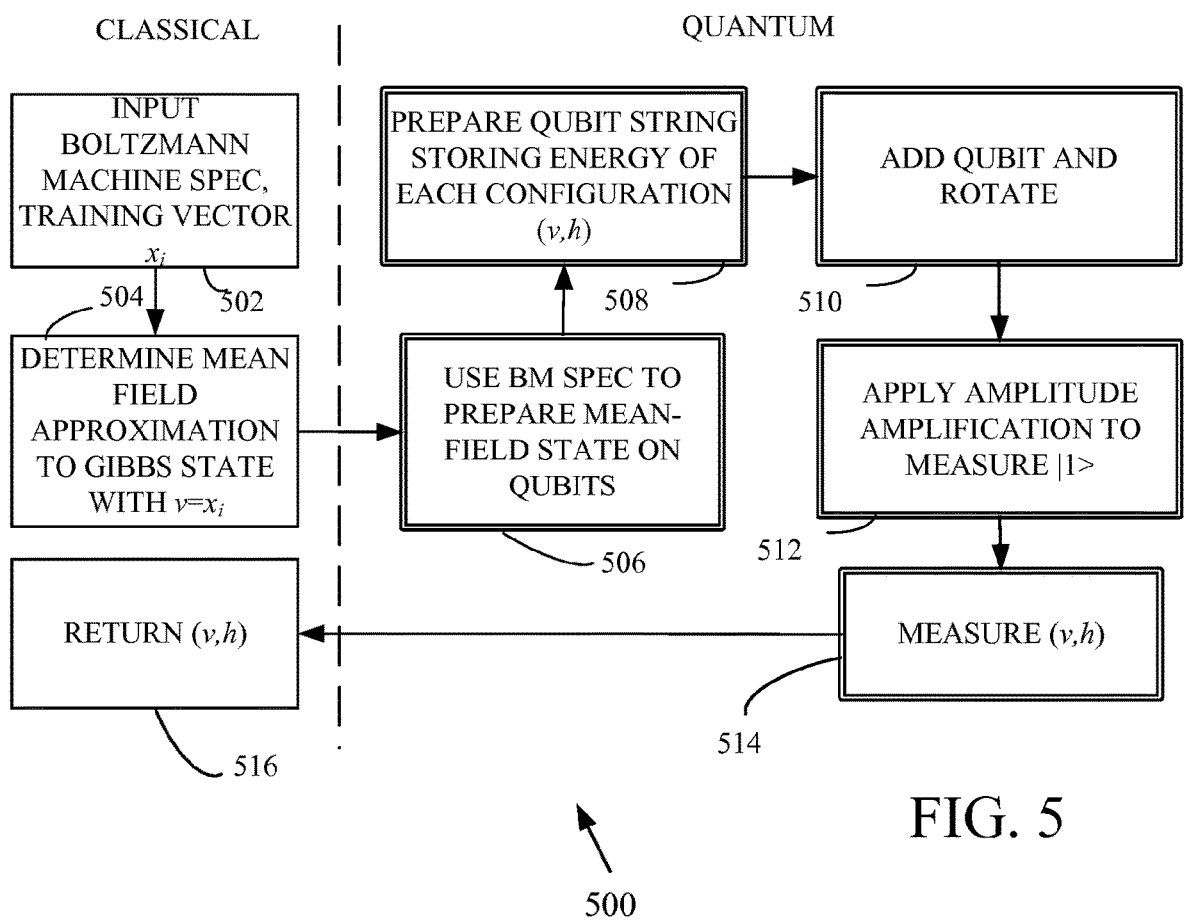
FIG. 5 illustrates a method of quantum-based sampling for determining a data average for use in training a Boltzmann machine using quantum computation.

A data average can be determined in a similar fashion. Referring to FIG. 5, a method 500 of sampling a data average includes receiving a Boltzmann machine specification at 502 and computing a mean field approximation to a Gibbs state with $v=x_i$ at 504. At 506, a mean-field state is prepared on qubits in a quantum computer, and at 508, a qubit string is prepared that stores energy of each configuration (v,h). This qubit string can be represented as $$\sum_{v,h} a(x_i, h) |x_i, h\rangle |E(x_i, h)\rangle.$$

At 510, a qubit is added, and quantum superposition is used rotate the qubit to $$\frac{\sqrt{P(x_i, h)}}{a(x_i, h)} |1\rangle + \sqrt{1 - \frac{P(x_i, h)}{a^2(x_i, h)}} |0\rangle.$$

At 512, amplitude estimation is used to measure $|1\rangle$ and at 514, (v,h) is measured. The measured value (v,h) is returned at 516.

Figure 6:
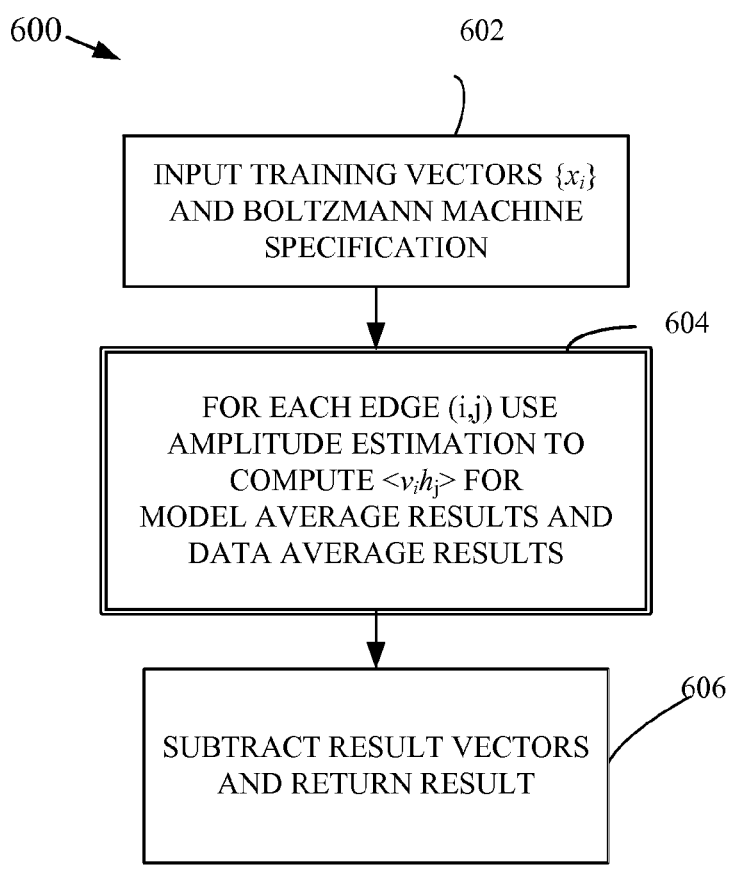
FIG. 6 illustrates a method of gradient calculation for a deep Boltzmann machine using amplitude estimation in a quantum computer.

A method 600 of gradient calculation using amplitude estimation is shown in FIG. 6. At 602, training vectors $\{x_i\}$ and an initial Boltzmann machine specification are provided. At 604, the model average and data average needed to compute the derivative of the objective function with respect to the edge weight (i,j) using amplitude estimation in a quantum computer are determined. The process for computing the derivatives with respect to biases is identical. At 606, the result vectors are subtracted, and the result returned.

Figure 7:
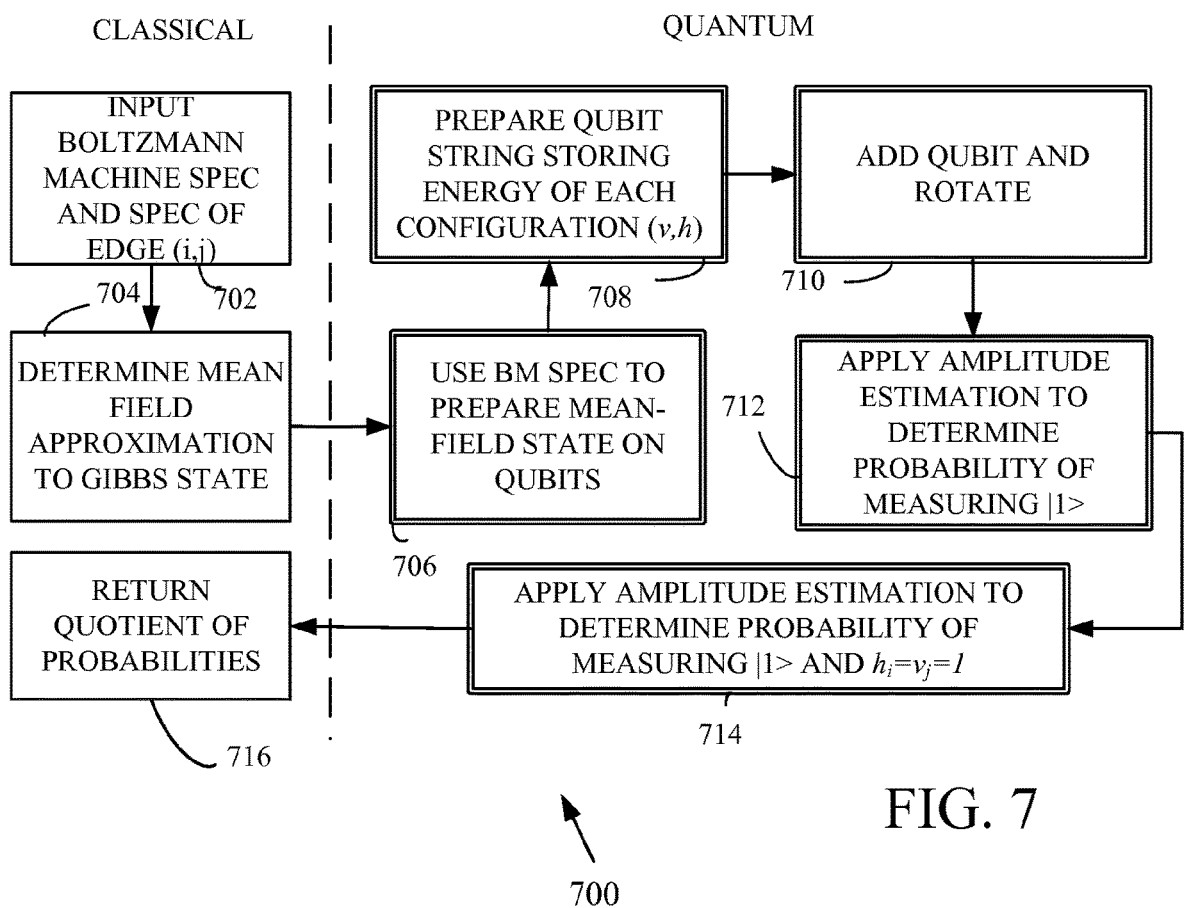
FIG. 7 illustrates a method of determining a model average for a Boltzmann machine using amplitude estimation in a quantum computer.

A model average can be determined using a method 700 shown in FIG. 7. A Boltzmann machine specification and an edge specification (i,j) are obtained at 702, and a mean field approximation to a Gibbs state is determined at 704. At 706, a mean-field state is prepared on qubits in a quantum computer, and at 708, a qubit string is prepared that stores energy of each configurations (v,h). This qubit string can be represented as $$\sum_{v,h} a(v,h)|v,h\rangle |E(v,h)\rangle.$$

At 710, a qubit is added, and quantum superposition is used rotate this qubit to $$\frac{\sqrt{P(v,h)}}{a(v,h)}|1\rangle + \sqrt{1 - \frac{P(v,h)}{a^2(v,h)}}|0\rangle.$$

At 712, amplitude estimation is used to determine a probability of measuring this qubit as $|1\rangle$ and at 714, amplitude estimation is used to determine the probability of this qubit being $|1\rangle$ and $h_i = v_j = 1$. The ratio of the two probabilities is returned at 716.

Figure 8:
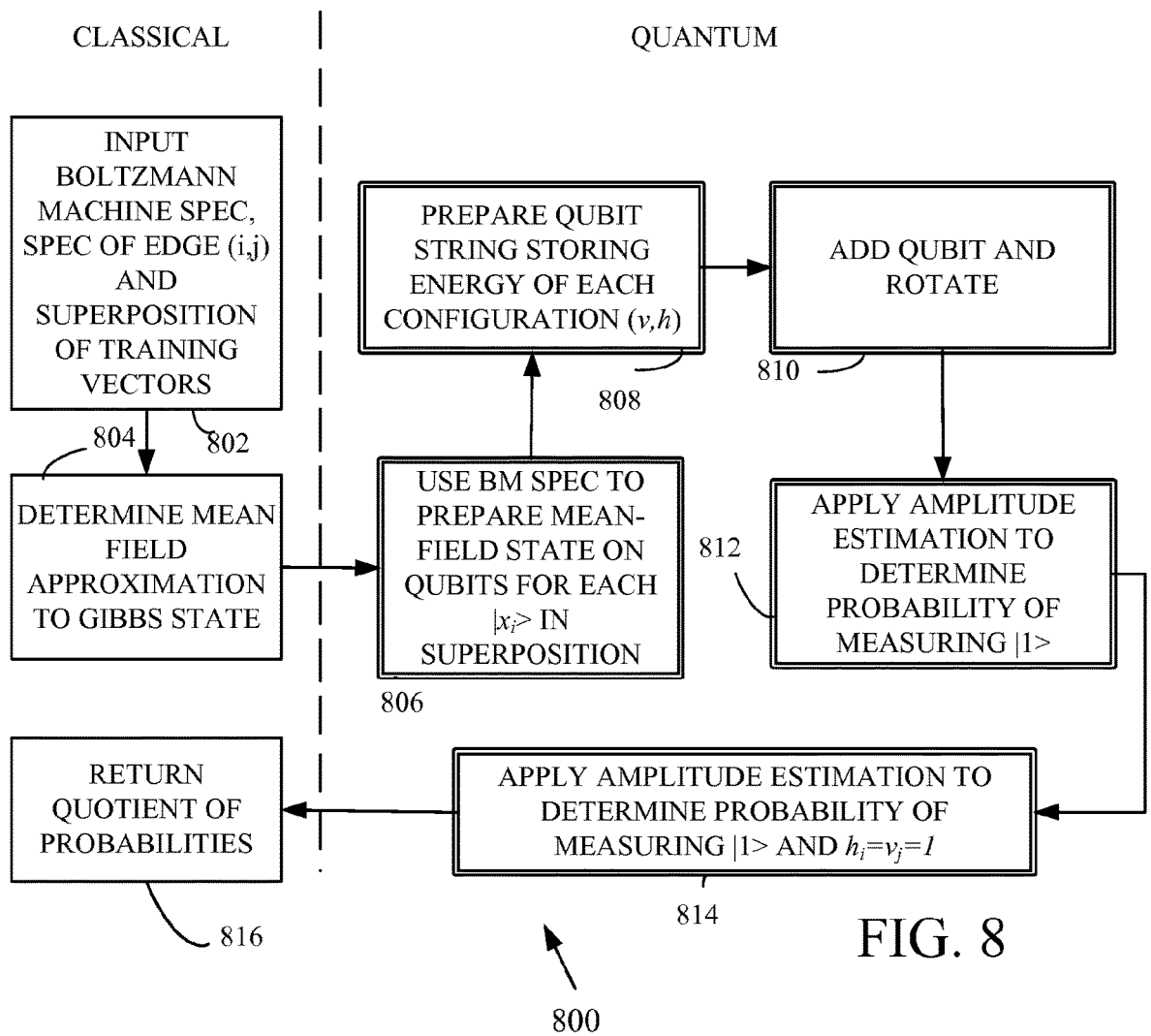
FIG. 8 illustrates an alternative method of determining a model average for a Boltzmann machine using amplitude estimation in a quantum computer.

A model average can also be determined using a method 800 shown in FIG. 8. A Boltzmann machine specification, an edge specification (i,j), and a superposition of training vectors $$\sum_i |i\rangle |x_i\rangle$$

are obtained at 802, and a mean field approximation to a Gibbs state is determined at 804. At 806, a mean-field state is prepared on qubits in a quantum computer simultaneously for each $|x_i\rangle$ in the superposition. At 808, a qubit string is prepared that stores the energy of each configuration (v,h). This qubit string can be represented as $$\sum_{v,h} a(v,h)|v,h\rangle |E(v,h)\rangle.$$

At 810, a qubit is added, and quantum superposition is used rotate this qubit to $$\frac{\sqrt{P(v,h)}}{a(v,h)}|1\rangle + \sqrt{1 - \frac{P(v,h)}{a^2(v,h)}}|0\rangle.$$

At 812, amplitude estimation is used to determine a probability of measuring this qubit as $|1\rangle$ and at 814, amplitude estimation is used to determine the probability of this qubit being $|1\rangle$ and $h_i = v_j = 1$. The ratio of the two probabilities is returned at 816.

Computing Environments

Figure 9:
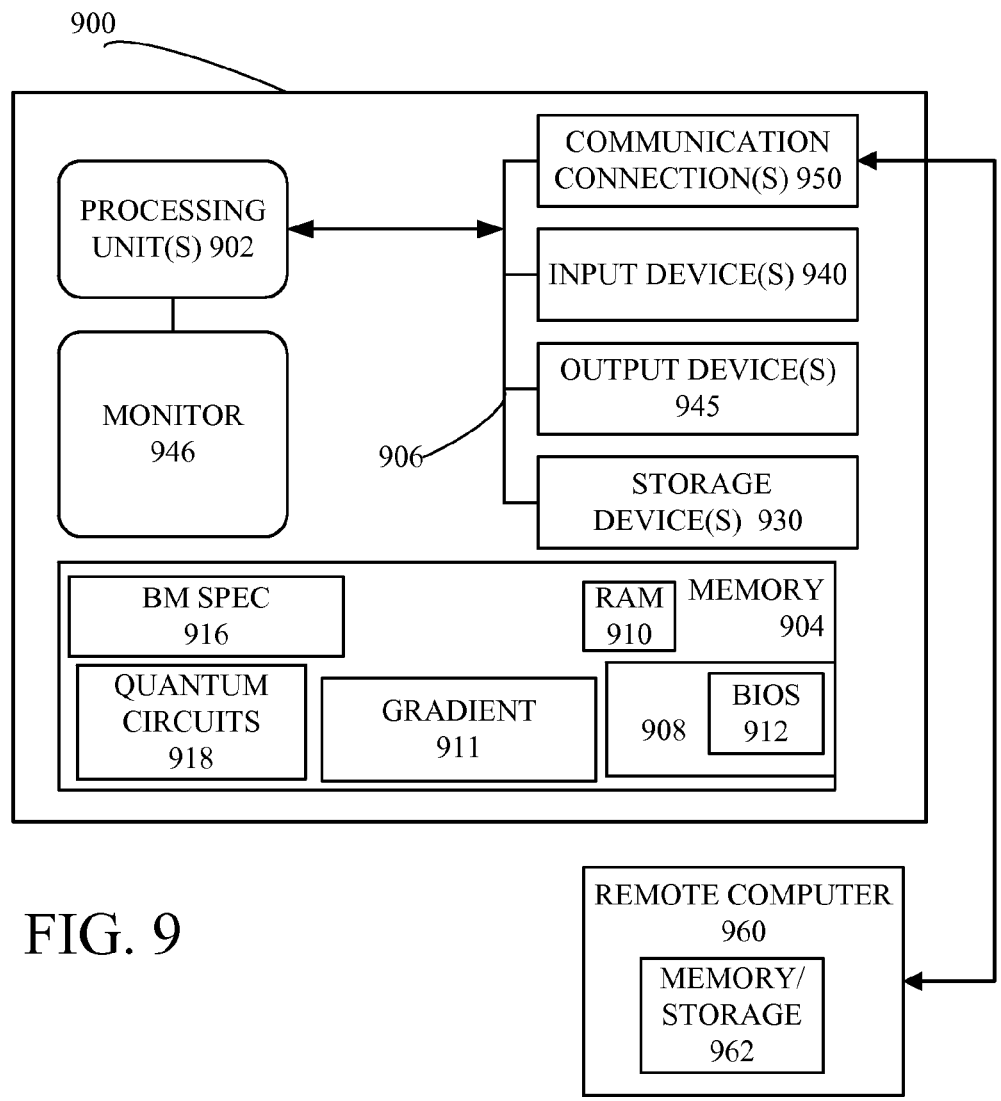
FIG. 9 illustrates a representative processor-based quantum circuit design environment for training a deep Boltzmann machine.

FIG. 9 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. Typically, a classical computing environment is coupled to a quantum computing environment, but a quantum computing environment is not shown in FIG. 9.

With reference to FIG. 9, an exemplary system for implementing the disclosed technology includes a general purpose computing device in the form of an exemplary conventional PC 900, including one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 904 includes read only memory (ROM) 908 and random access memory (RAM) 910. A basic input/output system (BIOS) 912, containing the basic routines that help with the transfer of information between elements within the PC 900, is stored in ROM 908.

As shown in FIG. 9, a specification of a Boltzmann machine is stored in a memory portion 916. In addition, a memory portion 918 stores circuit definitions that are used to configure a quantum computer to, for example, establish states that approximate the Gibbs state. Computer-executable instructions are also stored for receiving precisions as well as communicating circuit definitions and states to be used. Instructions for gradient determination and evaluation are stored at 911. In some examples, the PC 900 is provided with Boltzmann machine weights and biases so as to define a trained Boltzmann machine that receives input data examples, or produces output data examples. In alternative examples, a Boltzmann machine trained as disclosed herein can be coupled to another classifier such as another Boltzmann machine or other classifier.

The exemplary PC 900 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 906 by a hard disk drive interface, a magnetic disk drive interface, and an optical drive interface, respectively. The drives and their associated computer readable media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. Storage of Boltzmann machine specifications, and computer-executable instructions for training procedures, determining objective functions, and configuring a quantum computer can be stored in the storage devices 930 as well as or in addition to the memory 904. A user may enter commands and information into the PC 900 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902 through a serial port interface that is coupled to the system bus 906, but may be connected by other interfaces such as a parallel port, game port, or universal serial bus (USB). A monitor 946 or other type of display device is also connected to the system bus 906 via an interface, such as a video adapter. Other peripheral output devices 945, such as speakers and printers (not shown), may be included. In some cases, a user interface is display so that a user can input a Boltzmann machine specification for training, and verify successful training.

The PC 900 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above relative to the PC 900, although only a memory storage device 962 has been illustrated in FIG. 9. The storage device 962 can provide storage of Boltzmann machine specifications and associated training instructions. The personal computer 900 and/or the remote computer 960 can be connected to a logical a local area network (LAN) and a wide area network (WAN). Such networking environments are commonplace in offices, enterprise wide computer networks, intranets, and the Internet.

When used in a LAN networking environment, the PC 900 is connected to the LAN through a network interface. When used in a WAN networking environment, the PC 900 typically includes a modem or other means for establishing communications over the WAN, such as the Internet. In a networked environment, program modules depicted relative to the personal computer 900, or portions thereof, may be stored in the remote memory storage device or other locations on the LAN or WAN. The network connections shown are exemplary, and other means of establishing a communications link between the computers may be used.

With reference to FIG. 10, an exemplary system for implementing the disclosed technology includes computing environment 1000 that includes a quantum processing unit 1002 and one or more monitoring/measuring device(s) 1046.

The quantum processor executes quantum circuits that are precompiled by classical compiler unit 1020 utilizing one or more classical processor(s) 1010. Quantum circuits are downloaded into the quantum processing unit via a quantum bus 1006 based on Boltzmann machine specifications and training instructions, such as quantum state preparation procedures described above.

With reference to FIG. 10, the compilation is the process of translation of a high-level description of a quantum algorithm into a sequence of quantum circuits. Such high-level description may be stored, as the case may be, on one or more external computer(s) 1060 outside the computing environment 1000 utilizing one or more memory and/or storage device(s) 1062, then downloaded as necessary into the computing environment 1000 via one or more communication connection(s) 1050. Alternatively, the classical compiler unit 1020 is coupled to a classical processor 1010 and a procedure library 1021 that contains some or all procedures or data necessary to implement the methods described above such as a Boltzmann machine specification, state preparation procedures (e.g., qGenModelState, qGenDataState), and mean-field evaluations.

Having described and illustrated the principles of the disclosed technology with reference to the illustrated embodiments, it will be recognized that the illustrated embodiments can be modified in arrangement and detail without departing from such principles. The technologies from any example can be combined with the technologies described in any one or more of the other examples. Alternatives specifically addressed in these sections are merely exemplary and do not constitute all possible examples.

The invention claimed is:

1. A method of efficiently training a Boltzmann machine, comprising:
   with a classical computer, receiving a specification of a Boltzmann machine, an objective function, and associated training data, and
   in a quantum computer, determining at least one gradient of the objective function by:
      based on the specification of the Boltzmann machine, preparing a plurality of qubits to represent a Gibbs distribution;
      adding a qubit to the plurality of qubits and applying a rotation operator so that the added qubit has amplitudes of first and second states based on a joint probability distribution of hidden and visible unit values;
      producing the at least one gradient of the objective function by sampling the states of each of the plurality of qubits; and
   based on the at least one gradient of the objective function, specifying at least one visible bias, at least one hidden bias or at least one weight of the Boltzmann machine so as to produce a trained Boltzmann machine.

2. The method of claim 1, wherein the objective function is a sum of an average log-likelihood of the training data and a regularization function.

3. The method of claim 1, further comprising, in the quantum computer, producing a quantum state associated with model values, and in the classical computer, establishing the model values based on sampling of the quantum state.

4. The method of claim 3, wherein the model values are is revised using gradient ascent.

5. The method of claim 3, further comprising, in the quantum computer, producing a quantum state associated with data values, and in the classical computer, revising the model values based on sampling of the quantum state.

6. The method of claim 5, wherein the quantum state associated with the data values is produced based on a mean-field approximation to a Gibbs distribution.

7. A method, comprising:
preparing at least one quantum state in a quantum computer to approximate a Gibbs state and sampling the at least one quantum state;
preparing a qubit string storing energy values associated with a plurality of hidden weights and biases;
adding a qubit to the prepared qubit string and applying a rotation operator so that the added qubit has amplitudes of first and second states based on a joint probability distribution of hidden and visible unit values;
applying amplitude estimation to the prepared qubit string with the added qubit and measuring a state of the added qubit;
determining a distribution of hidden and visible unit values based on the measured state of the added qubit; and
estimating in a classical computer, gradients of an objective function based on the determined distribution of hidden and visible unit values.

8. The method of claim 7, further comprising defining weights or biases for a Boltzmann machine based on the estimated gradients of the objective function.

9. The method of claim 8, further comprising processing a data example based on the defined weights and biases of the Boltzmann machine.

10. The method of claim 9, wherein the data example is associated with an image, a shape, speech, a text, an audio recording, a video recording, or a quantum state.

11. The method of claim 8, further comprising updating weights or biases associated with the Boltzmann machine based on gradients of at least one of Boltzmann machine weights, hidden biases, and visible biases.

12. The method of claim 8, wherein the objective function is associated with a sum of an average log-likelihood of the training data and a regularization function.

13. The method of claim 8, wherein the Boltzmann machine is a deep restricted Boltzmann machine having two or more layers.

14. The method of claim 7, wherein the preparing at least one state in the quantum computer comprises preparing a state associated with model weights, and hidden and variable biases.

15. The method of claim 14, further comprising computing a mean-field partition function, wherein the at least one state is based in part on the mean-field partition function.

16. The method of claim 7, wherein the preparing at least one quantum state in the quantum computer comprises preparing a state associated with model weights, and hidden and variable biases, with visible units fixed so as to correspond to a selected training vector.

17. The method of claim 16, further comprising computing a mean-field partition function, wherein the at least one state associated with model weights, and hidden and variable biases is based in part on the mean-field partition function associated with the selected training vector.

18. A method, comprising:
in a classical computer,
receiving a training data set, a specification of a deep Boltzmann machine, and an objective function;
in a quantum computer, establishing a mean-field state on a plurality of qubits based on a mean-field approximation so as to approximate a Gibbs state; and
adding a qubit to the plurality of qubits and applying a rotation operator so that the added qubit has amplitudes based on a joint probability distribution of hidden and visible unit values; and
in the classical computer,
estimating a gradient of the objective function based on sampling the mean-field state, and determining hidden biases and weights of the deep Boltzmann machine; and
processing an input data example associated with an image, a shape, speech data, a text, an audio recording, a video or a quantum state output by a quantum device based on the Boltzmann machine.

* * * * *